C. P. SLAGLE.
VEGETABLE CUTTER.
APPLICATION FILED NOV. 6, 1919.
1,333,641. Patented Mar. 16, 1920.
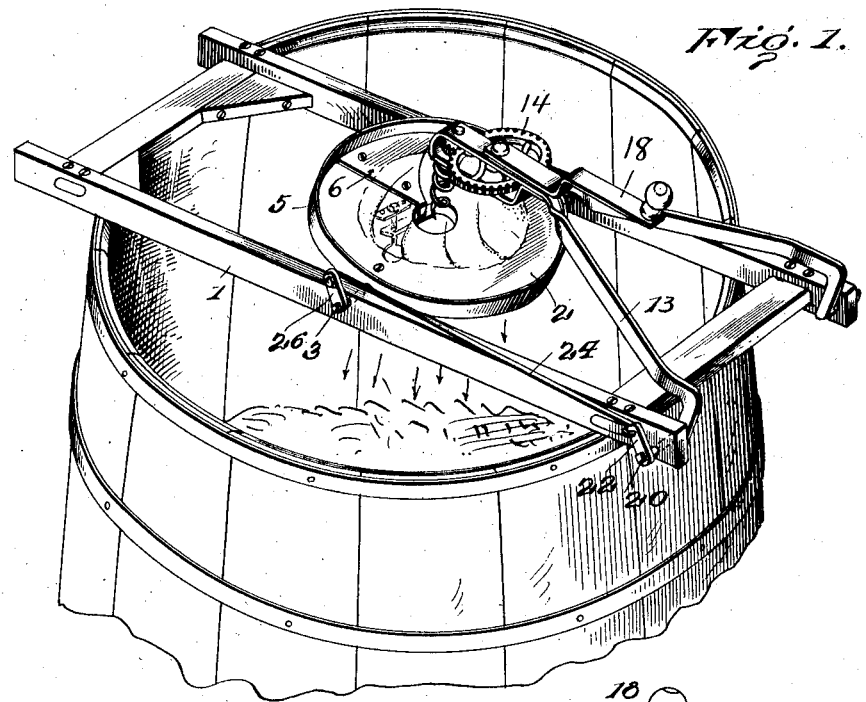
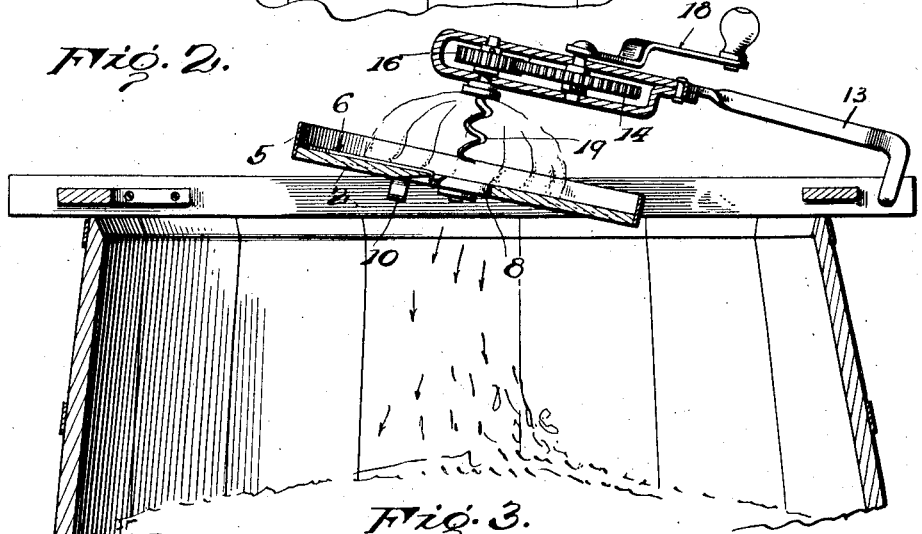
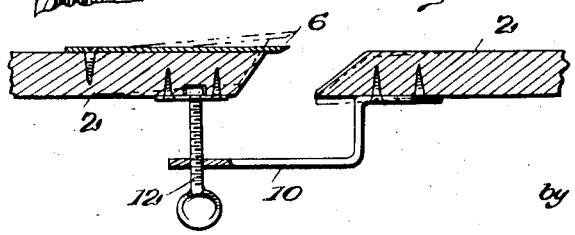
Inventor.
Clarence P. Slagle.
by Robertson & Johnson
his Atty's.

UNITED STATES PATENT OFFICE.

CLARENCE P. SLAGLE, OF LONACONING, MARYLAND.

VEGETABLE-CUTTER.

1,333,641.  Specification of Letters Patent.  Patented Mar. 16, 1920.

Application filed November 6, 1919. Serial No. 336,161.

*To all whom it may concern:*

Be it known that I, CLARENCE P. SLAGLE, a citizen of the United States of America, and a resident of Lonaconing, in the county of Allegheny and State of Maryland, have invented certain new and useful Improvements in Vegetable-Cutters, the object of the invention being to provide a simple, effective, and durable cutter that can be placed upon a pan or over a barrel.

In the preferable embodiment of my invention I employ a frame upon which is supported a cutting pan, a rotatable cabbage holder being connected with said pan in such a manner that when the rotatable holder is lifted to place a new cabbage in position for cutting the pan will be tilted so that it will always occupy the same position with respect to the cabbage holder.

The invention consists in the arrangement shown in its preferable embodiment in the accompanying drawings and hereinafter described and claimed.

In the drawings:

Figure 1 is a perspective view of my invention placed over the top of a barrel.

Fig. 2 is a longitudinal section of the same.

Fig. 3 is a sectional detail.

Referring now to the details of the drawings by numerals: 1 represents a frame which in the present instance is of rectangular form, although it may be of any other desired shape. On this frame is journaled a cutting pan 2 having one of its journals 3 projecting entirely through the frame, as illustrated in Fig. 1. The cutting pan preferably has an annular rim 5 and is provided with a cutter 6, which as illustrated in Fig. 3, is adjustable so that it may be moved with respect to the pan proper in order to cut different thicknesses. To this end, the pan is provided with an underhanging bracket 10 having a set screw 12 threaded in its free end, the upper end of the set screw moving up against the bottom of the frame forming the knife. It will be obvious from Fig. 3 that when it is desired to cut the material of considerable thickness, the set screw 12 is adjusted so as to draw down the material forming the pan proper and project the knife 6 upward. The rear end of the frame 1 is provided with an overhanging pivoted Y-shaped frame 13, the outer end of which forms a housing for two gear wheels 14 and 16. The gear wheel 14 has connected to it a crank 18 while the gear wheel 16 is provided with a screw 19 to be inserted in the cabbage in order that the cabbage may be turned against the knife 6 in a manner well understood. The Y-shaped frame 13 has one of its pivots 20 projecting through the frame and to this pivot 20 is connected a crank arm 22 and this crank arm 22 is connected by a rod 24 to a similar arm 26 on the pivot 3 of the cutting pan 2. It will be obvious from this construction that when the Y-shaped frame 12 and its gears 14, 16 and the screw 19 are swung upwardly on the pivots at the rear of the frame 1, the crank arm 22 will be moved to draw upon the rod 24 and thus move the crank arm 26 and swing the cutting pan 2 on its pivots at the same time that the frame 12 and its screw 19 are elevated. Likewise, when the frame is lowered, the cutting pan will be moved back to its horizontal position. It will thus be seen that as the Y-shaped frame 12 is moved up and down to accommodate different size cabbages or as the frame 12 is moved down as the cabbage is being cut, the cutting pan 2 is tilted so that it is always set at the same angle with respect to the frame 12 and the screw 19. I deem this important.

From the foregoing and accompanying drawings, it will be seen that I have constructed a kraut cutter in which the cutting pan and the frame for rotating the cabbage are so connected together that when said frame is raised or lowered the pan will be tilted upon its pivot, and as the frame is lowered in the act of cutting the cutting tool is always kept in the same relation with respect to the article being cut.

What I claim as my invention is:

1. In a device of the character described, a suitable support, a cutting pan pivotally mounted upon said support, a frame also pivotally mounted upon said support, said cutting pan being provided with a cutter and said frame having means for rotating the article to be cut, and a connection between said cutting pan and said frame whereby when the frame is raised or lowered the cutting pan will correspondingly move on its pivot.

2. In a device of the character described, a suitable support, a cutting pan pivotally mounted upon said support, a frame also pivotally mounted upon said support, said cutting pan being provided with a cutter and said frame having means for rotating the article to be cut, means for adjusting said cutter, and a connection between said cutting pan and said frame whereby when the frame is raised or lowered the cutting pan will correspondingly move on its pivot.

3. In a device of the character described, a suitable support, a cutting pan pivotally mounted upon said support, a frame also pivotally mounted upon said support, said frame having a crank handle and a screw for rotating the article to be cut, and a connection between said cutting pan and said frame whereby when the frame is raised or lowered the cutting pan will be correspondingly moved on its pivot.

4. In a device of the character described, a suitable support, a cutting pan pivotally mounted upon said support, a crank arm projecting from one of the pivots of said pan, a frame also pivotally mounted upon said support and having means for rotating the article to be cut, a crank arm projecting from one of the pivots of said frame, and a connection between the crank arm of said pan and the crank arm of said frame, whereby when the frame is raised or lowered the cutting pan will be correspondingly moved on its pivot.

5. In a device of the character described, a suitable support, a cutting pan pivotally mounted upon said support, a frame also pivotally mounted upon said support, a crank handle and a screw mounted on said frame, gearing between said crank handle and said screw, and a connection between said cutting pan and said frame whereby when the frame is raised or lowered the cutting pan will be correspondingly moved on its pivot.

In testimony whereof I affix my signature in presence of two witnesses.

CLARENCE P. SLAGLE.

Witnesses:
 ALVIN H. TERNENT,
 JOHN W. FAZENLAKER.